US005783002A

United States Patent [19]
Lagnier

[11] Patent Number: 5,783,002
[45] Date of Patent: Jul. 21, 1998

[54] TIRE TREAD INCLUDING INCISIONS

[75] Inventor: Alain Lagnier, Romagnat, France

[73] Assignee: Compagnie Generale des Etablissements Michelin - Michelin & Cie, Clermont-Ferrand Cedex, France

[21] Appl. No.: 765,138

[22] PCT Filed: Jun. 23, 1995

[86] PCT No.: PCT/EP95/02455

§ 371 Date: Jan. 2, 1997

§ 102(e) Date: Jan. 2, 1997

[87] PCT Pub. No.: WO96/01189

PCT Pub. Date: Jan. 18, 1996

[30] Foreign Application Priority Data

Jul. 5, 1994 [FR] France .................. 94 08377

[51] Int. Cl.⁶ ........................... B60C 11/12
[52] U.S. Cl. ............... 152/209 R; 152/DIG. 3
[58] Field of Search ......... 152/209 R, 209 D, 152/DIG. 3

[56] References Cited

U.S. PATENT DOCUMENTS

| | | |
|---|---|---|
| 2,122,736 | 6/1938 | Bourdon . |
| 3,470,404 | 9/1969 | Agerman et al. . |
| 3,608,602 | 9/1971 | Youngblood . |
| 4,566,514 | 1/1986 | Mauk et al. ............ 152/DIG. 3 |
| 4,598,747 | 7/1986 | Flechtner .............. 152/DIG. 3 |
| 4,794,965 | 1/1989 | Lagnier . |
| 5,350,001 | 9/1994 | Beckmann et al. . |

FOREIGN PATENT DOCUMENTS

| | | | |
|---|---|---|---|
| 4-306106 | 10/1992 | Japan ................. | 152/209 R |
| 4-310407 | 11/1992 | Japan ................. | 152/209 D |
| 5-58118 | 3/1993 | Japan ................. | 152/209 D |
| 6-143941 | 5/1994 | Japan ................. | 152/209 R |
| 1150295 | 4/1969 | United Kingdom . | |

Primary Examiner—Steven D. Maki
Attorney, Agent, or Firm—Baker & Botts, L.L.P.

[57] ABSTRACT

A tire tread (10) comprising at least some elements in relief, provided with at least one incision (1), each of the facing walls P of which has a surface in relief, formed of protrusions (2) and of cavities (3) arranged on opposite sides of a central wall surface M, each of such protrusions (2) and cavities (3) having, on said central surface (M), a quadrilateral base ($b_S$, $b_C$) and a vertex (S, O', A', B', C') spaced from said surface, the base $b_S$ of a protrusion (2) being completely surrounded by bases $b_C$ of cavities (3).

10 Claims, 6 Drawing Sheets

TIRE TREAD INCLUDING INCISIONS

BACKGROUND OF THE INVENTION

The present invention relates to the tread of a tire intended to travel on snow-covered, icy or wet roads.

Such a tread is generally provided with elements in relief, ribs or blocks, separated from each other in circumferential direction and/or transverse direction by transverse and/or circumferential grooves and provided with numerous incisions or slits the widths of which are other than zero but far less than the widths of said transverse and circumferential grooves.

Numerous types of incisions have been proposed in order to improve the adherence of the tire to roads of the type in question. As known from French Patent 2 418 719, said incisions may be normal to the surface of the tread or inclined with respect to the direction perpendicular to said surface. Said patent explains what is to be understood by the expression slit or incision, a slit or incision being not only a linear slit in the direction of its depth and/or of its length but also a slit having any other trace, for instance curved, undulated, etc., whatever the cutting plane (longitudinal, transverse or oblique) in question.

French Patent 791 250 shows an example of a slit or incision having an undulated trace on the surface of the tread and even a trace undulated in any cutting plane not containing a generatrix of the undulated surface of the walls of the incision.

French Patent 2 025 124 likewise describes incisions the wall surfaces of which are not flat surfaces but have a relief, although remaining substantially parallel to each other, whatever the trace obtained on any cutting plane. The incision shown in said patent has the feature that it has an undulated surface with circular generatrices, as compared with the incision shown in the preceding patent in which the undulated surface is one with so-called linear generatrices, said generatrices being parallel to each other in both cases.

There can readily be imagined, between these two extremes, incision walls which present a relief for which the generatrices would, for instance, be undulated or zig-zag, the relief then resembling a succession of peaks separated by valleys, the peaks and valleys being undulated, zig-zag or of broken lines in the direction of their lengths.

The incisions described above have an anisotropy factor and their deformations are not identical, whatever the orientations of the forces imposed. There follow from this displacements of the incision walls with respect to each other which differ in accordance with the directions of the forces imposed, which influences not only the rigidity of the elements in relief provided with such incisions but also the performance relative to the behavior of the vehicle equipped with them such as the directional control, the maneuverability of the vehicle, the firmness of the response to the impulses given the steering wheel, and/or else the spiralling upon turning.

SUMMARY OF THE INVENTION

It may be of interest in certain cases to improve said performances, while retaining an incision trace, whether on the surface of the tread or in depth which can be represented by a periodic function and thus obtain optimal properties of the elements in relief of the tread for the entire life of the tire. For this purpose, the invention proposes providing at least certain elements in relief of the tread with at least one incision each of the facing walls of which has a surface in relief formed of protrusions and cavities arranged on opposite sides of a central wall surface, each of said protrusions and cavities having, on said central surface, a quadrilateral base and, spaced from said surface, a vertex, the base of a protrusion being completely surrounded by bases of cavities and, conversely, the ba s e of a cavity being completely surrounded by bases of protrusions, the two surfaces of the two walls respectively being identical so as to form the incision with the desired width.

The protrusions are arranged on one side of the central surface of the wall, while the cavities are arranged on the other side, said central surface being the geometrical locus of all the bases of the protrusions and the cavities.

In order to facilitate the manufacture of the metal blades of the mold which is intended for the vulcanizing of the tread of the invention, said central surface is preferably a plane.

The protrusions and cavities will preferably have similar geometrical shapes. While these protuberances may have vertices separated from the central plane by distances which differ from each other, they will advantageously, for the same reasons of cost of manufacture, have identical shapes, the central plane being then a median plane.

The respective bases of the protrusions and cavities may be squares, rectangles, trapezoids, diamonds, etc., that is to say regular quadrilaterals. As to the curves joining the vertices of protrusions or cavities respectively to the corresponding bases, they will advantageously be circular arcs, semi-parabolas, straight-line segments, or portions of a sinusoid, for instance a portion corresponding to a peak-to-peak half period.

The walls of the vulcanized rubber blades defined by the incisions in accordance with the invention are thus provided with geometrical shapes, the faces of each joining the base to the vertex forming an acute angle with the surface of the tread and/or, more particularly, with any plane perpendicular to said surface, contrary to the incision walls described in British Patent 1 150 295, in which the protrusions and cavities are only truncated pyramids with a diamond-shaped base. This type of shape does not make it possible, as in the case of the present invention, to obtain, under the effect of the load applied to a rubber blade between incisions, the production of tangential force induced by said inclination of the incisions, which tangential force is a source for the improvement of the adherence of the tire to slippery, wet and/or icy pavements and has a substantial effect on the phenomena of irregular wear.

The characteristics of the invention will become evident from the following description, given with reference to the accompanying drawing by way of explanation but not of limitation, of several embodiments in accordance with the invention.

DESCRIPTION OF PREFERRED EMBODIMENTS

Figure 1:
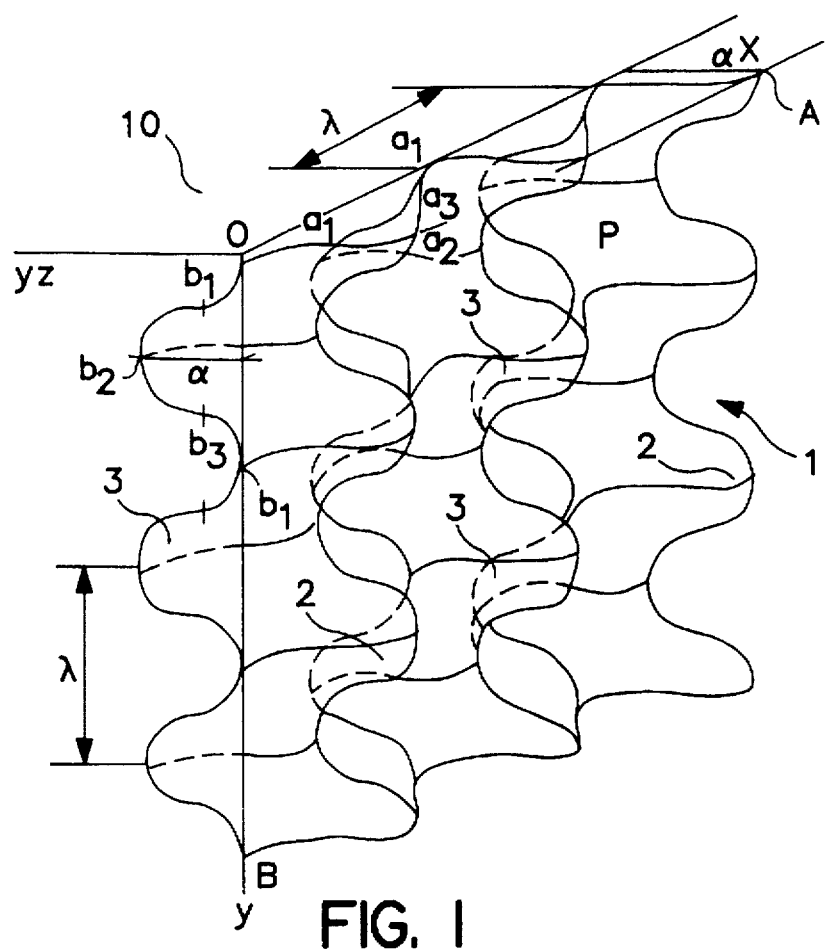
FIG. 1 is, in a first variant, a diagrammatic view, in perspective, of a wall of an incision in accordance with the invention.

FIG. 1 shows, in perspective, a wall P of an incision 1, a relief element of the tread 10 in accordance with the invention being possibly provided with one or more incisions 1 of this type. This wall P, in three dimensions, can be considered a surface in relief,which is undulated in two directions Ox and Oy, these undulations being characterized by protrusions 2 and cavities 3 located on opposite sides of the middle plane xOy of the wall P. These protrusions and cavities have a domelike shape, produced by the translation, along the trace OA of the wall P on the surface of the tread, of the trace OB of the wall in depth in a plane perpendicular to the surface of the tread and to the center axis of said trace, two traces being, in the example described, identical to each other and undulated. These two traces are formed by the succession of quarter circles $Oa_1$, $a_1a_2$, $a_2a_3$, $a_3a_4$, etc. in the case of the trace OA, and $Ob_1$, $b_1b_2$, $b_2b_3$, $b_3b_4$, etc. in the case of the trace OB. Each of these two traces, referred to as circularly undulated, has, by convention and although not sinusoidal in the strict sense of the term, the same amplitude $\alpha$ and the same wavelength $\lambda$.

Figure 2:
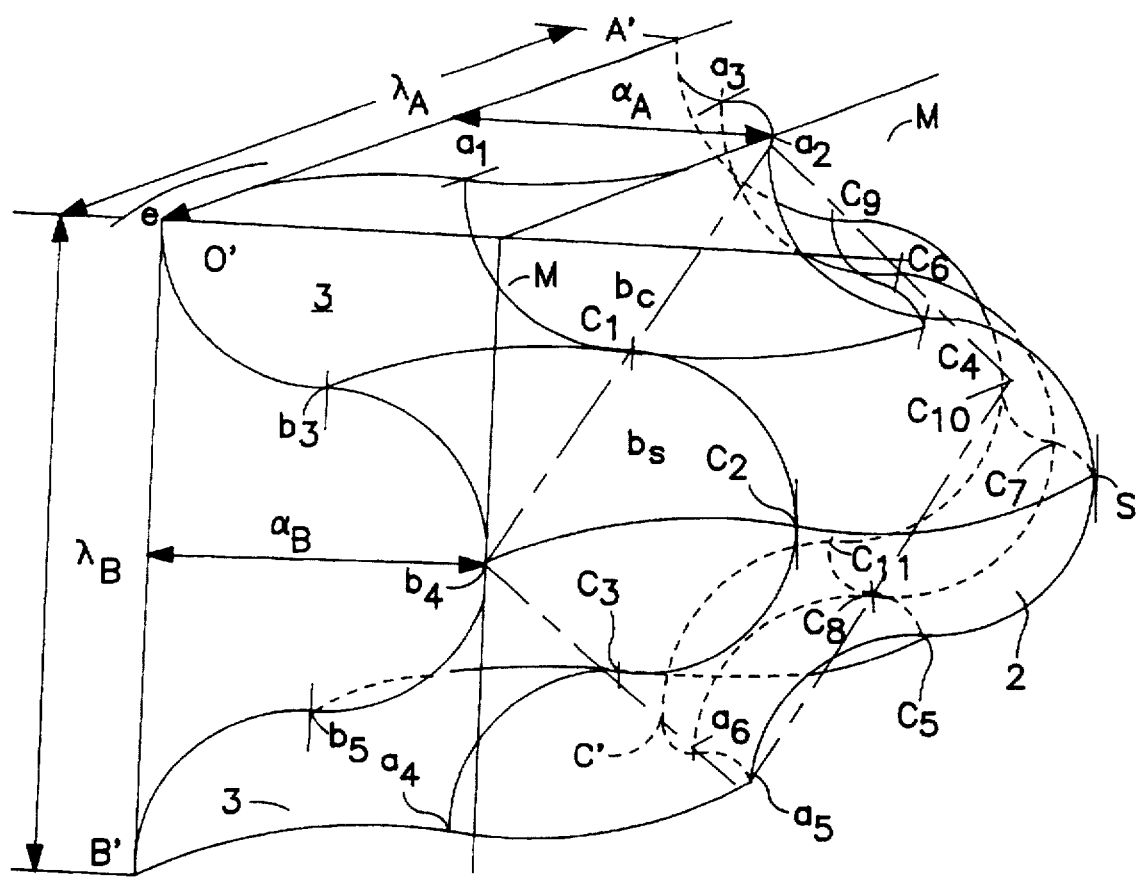
FIG. 2 is an enlarged diagrammatic view of a part of an incision wall similar to that shown in FIG. 1.

FIG. 2 shows, on a larger scale, the geometrical shape of a single protrusion 2, while the four neighboring cavities are shown only in part. The surface in relief which is thus shown corresponds to the translation along the trace O'A', of amplitude $\alpha_A$, and the width O'A' of which is equal to the wavelength $\lambda_A$ (although the trace is not theoretically sinusoidal), of the trace in depth O'B' of amplitude $\alpha_B$, equal to $\alpha_A$ in the example described (but possibly different in other cases), and of the length O'B' equal to the wavelength $\lambda_B$, equal to $\lambda_A$. There is thus obtained, in a plane parallel to the tread surface and containing the point $b_3$ of the trace in depth, a trace $b_3c_1c_4c_6c_9$ and in a plane parallel to the surface of the tread and containing the point $b_4$ of the trace in depth a trace $b_4c_2Sc_7c_{10}$, also in the plane containing the part $b_5$ a trace $b_5c_3c_5c_8c_{11}$, and in the plane containing the point B' the trace B'$a_4a_5a_6$C'. The central surface is a center plane M, which plane is also the median plane due to the fact that the vertices S of the protrusions and the vertices of the cavities O',A',C' are equidistant from said plane M, the common distance being equal to the common amplitude $\alpha_A.\alpha_B$ of the two traces O'A' and O'B' of the incision on the surface of the tread and in depth respectively. If we consider the protrusion 2 of vertex S, it has, on the central plane M, a base $a_2b_4a_5c_{10}$, which base $b_S$ is square in the case described. The side $a_2b_4$ is also the side of the square base $b_C$ corresponding to the cavity 3 of vertex O'. Likewise, the sides $B_4a_5$, $a_5c_{10}$, $c_{10}a_2$ are also the sides of the bases $b_C$ of the cavities 3 of vertex B',C',A' respectively, which bases surround the base corresponding to the protrusion 2 of vertex S. As to the shape of a protrusion 2 or a cavity 3, it is formed on the one hand of the base and on the other hand of four curved faces which are convex in the case of the parts close to the vertex and concave in the case of the parts close to the base.

A single wall has been shown in FIGS. 1 and 2 for the clarity of the drawing. The other wall P', intended to form the incision, has a shape identical to the wall P: it is simply spaced from the wall P by the width e of the incision (FIG. 2).

Figure 3:
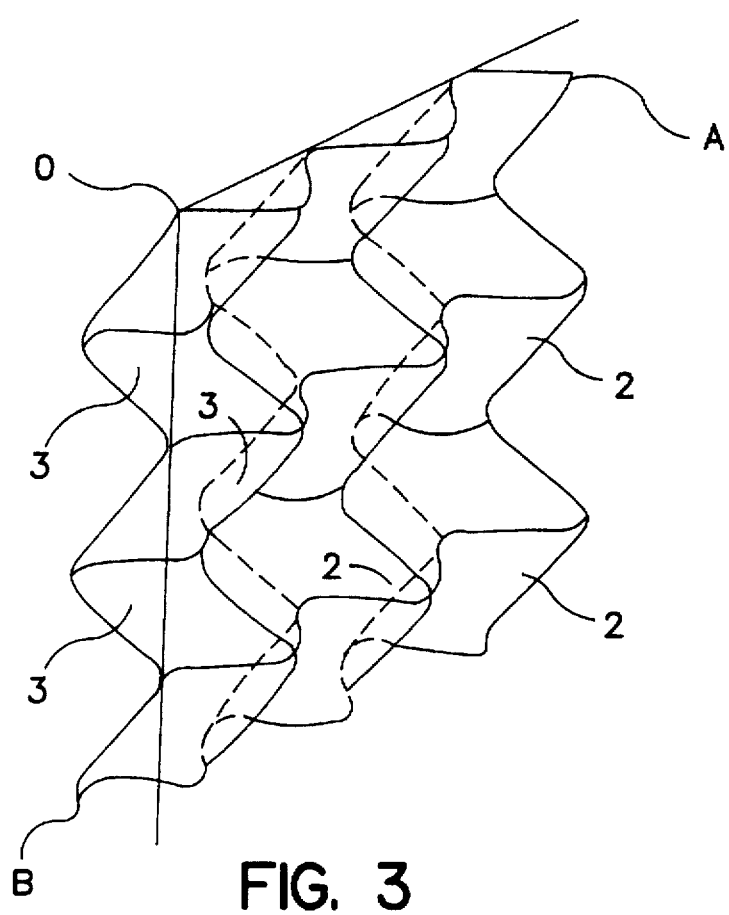
FIG. 3 is a diagrammatic view, in perspective, of an incision wall according to a second variant of the invention.

FIG. 3 shows a variant corresponding to a wall P of incision 1 formed of protrusions 2 and cavities 3 in the form of tetrahedrons with rounded vertices generated by the translation, along the trace OA on the tread in zig-zag shape with round vertex (sequence of straight-line segments connected by circular arcs), of a trace in depth OB of the same shape as trace OA, amplitudes and wavelengths being the same for both traces.

There also falls within the scope of the invention an incision 1 generated by the translation along a trace OA on the tread which trace is undulated circularly, sinusoidally or otherwise or zig-zag, having an amplitude $\alpha_A$ and a wavelength $\lambda_A$, of a trace in depth not identical to the trace OA and different by its wavelength $\lambda_B$ and/or by its amplitude $\alpha_B$.

Figure 4:
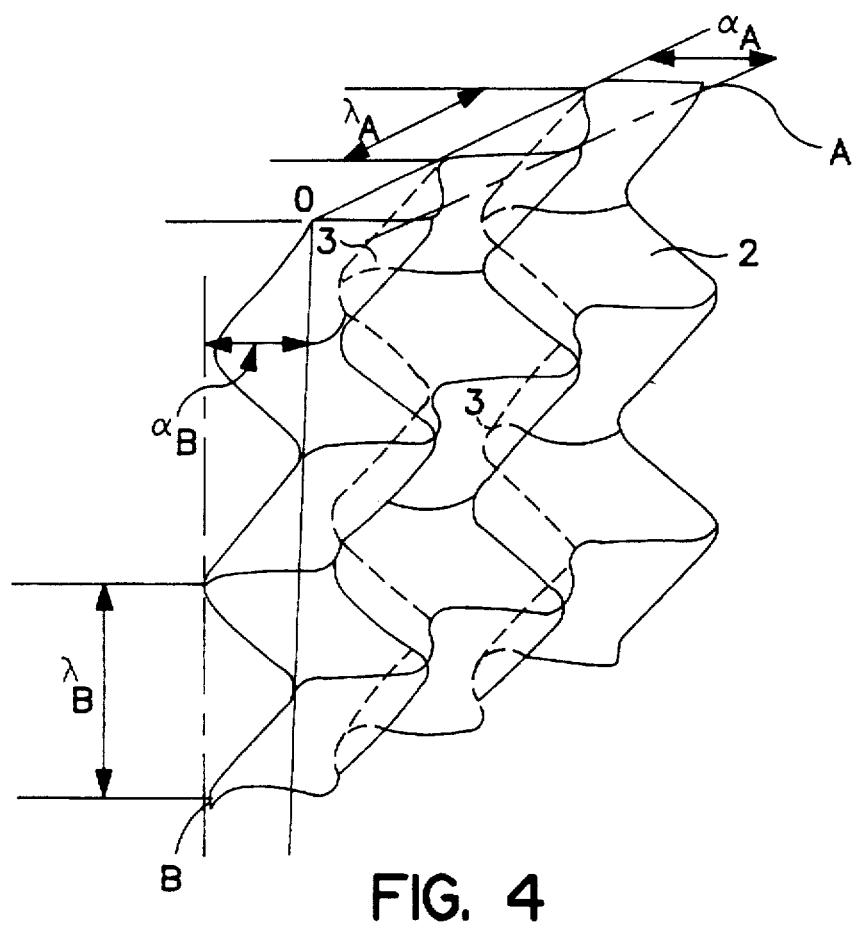
FIG. 4 is a diagrammatic view, in perspective, of another variant.

An incision in accordance with the invention may also have, on the tread surface, a trace OA which is undulated circularly, sinusoidally or otherwise, or zig-zag, the amplitude $\alpha_A$ and the wavelength $\lambda_A$ of which are constant over the entire length of the trace, and in depth an undulated or zig-zag trace the amplitude $\alpha_B$ of which, however, decreases as a function of the depth and this with constant wavelength. FIG. 4 shows such an incision in which the amplitude $\alpha_B$ is inversely proportional to the depth of the incision 1, while the wavelength $\lambda_B$ remains constant. The protrusions 2 and the cavities 3 have the shape of tetrahedrons with rounded vertices, said vertices being closer to each other in the bottom part of the incision.

There also falls within the scope of the invention an incision 1 which is generated by the translation along a trace OA on the tread which is undulated circularly, sinusoidally or otherwise, or zig-zag, having an amplitude $\alpha_A$ and a wavelength $\lambda_A$, of a trace in depth of constant amplitude $\alpha_B$ and of wavelength $\lambda_B$, which varies as a function of the depth.

Figure 5:
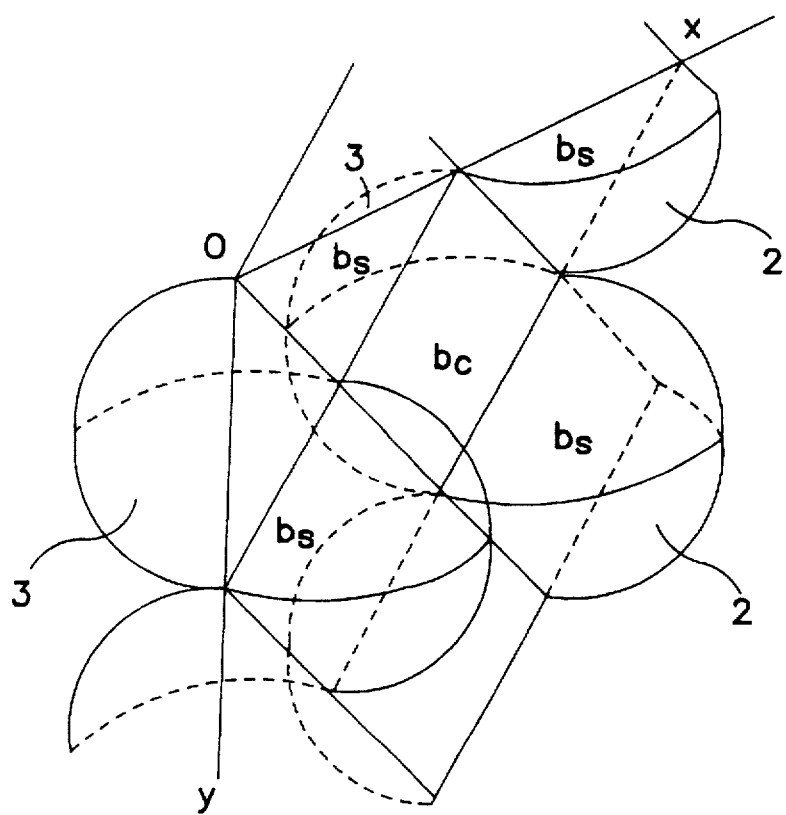
FIG. 5 is an enlarged diagrammatic view, in perspective, of a part of the wall in accordance with a fourth variant incision according to the invention.

FIG. 5 shows a wall P of an incision 1 in accordance with the invention which no longer corresponds, as in the previous cases, to traces on the surface of the tread and in depth of undulated or zig-zag shape, being formed of a succession of half circles. The wall 1 is formed of protrusions 2 the bases of which in the plane xOy are, for instance, rectangles. For greater clarity, only three protrusions 2 the bases $b_S$ of which surround a base $b_C$ of the cavity 3 are shown.

Figure 6:
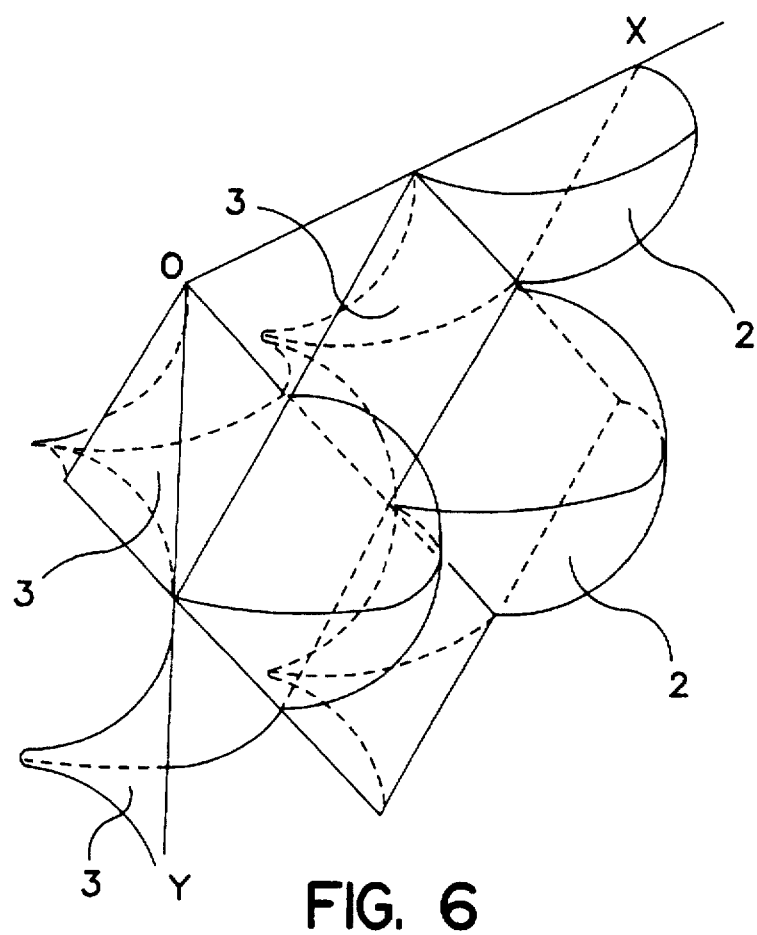
FIG. 6 is an enlarged diagrammatic view of a part of a wall in accordance with a fifth variant, which is very similar to that shown in FIG. 5.

In the case of FIG. 5, protrusions and cavities have the same geometrical shape, which can be defined as formed of the base and of four convex curved faces. In the case of FIG. 6, while the protrusions 2 still have convex curved faces, the cavities 3 have concave curved faces, which makes it possible to find again, in depth, therefore after wear, at any level whatsoever, the same trace as the trace on the surface of the tread, while an incision such as shown in FIG. 5 does not permit this.

I claim:

1. A tire tread (10) comprising elements in relief provided with incisions (1), characterized by the fact that at least certain elements in relief are provided with at least one incision (1) each of the facing walls P of which is a surface in relief, formed of protrusions (2) and cavities (3) arranged on both sides of a central wall surface (M), each of said wall protrusions (2) and cavities (3) having, on said central wall surface (M), a quadrilateral base ($b_S$, $b_C$) and a vertex (S, O', A', B', C') spaced from said central wall surface (M), the base $b_S$ of a protrusion (2) being completely surrounded by bases $b_C$ of cavities (3) and conversely the base $b_C$ of a cavity (3) being completely surrounded by bases $b_S$ of protrusions (2), the two surfaces in relief of the two walls P respectively being identical so as to form the incision (1) having a width e.

2. A tread according to claim 1, characterized by the fact that the protrusions (2) and the cavities (3) have identical geometrical shapes.

3. A tread according to claim 2, characterized by the fact that the incision (1) has on the tread (10) and on each entire surface parallel to said surface of the tread (10) and in depth over any plane perpendicular to the surface of the tread, undulated traces (OA, OB) the respective amplitudes of which are equal to each other and to $\alpha$ and the respective lengths of which are equal to each other and to $\lambda$, the protrusions (2) and cavities (3) being each formed by a base ($b_S$, $b_C$) and four curved faces which are convex towards the vertex and become concave towards the base.

4. A tread according to claim 3, characterized by the fact that the traces are circularly undulated.

5. A tread according to claim 3, characterized by the fact that the traces are sinusoidally undulated.

6. A tread according to claim 2, characterized by the fact that the incision (1) has traces (OA, OB) on the tread and in depth which are zig-zag traces of the same wavelength $\lambda$ and the same amplitude $\alpha$, the protrusions (2) and cavities (3) being tetrahedrons with rounded vertices.

7. A tread according to claim 1, characterized by the fact that the incision (1) has, on the surface of the tread, a trace OA which is undulated circularly, sinusoidally or zig-zag, having an amplitude $\alpha_A$ and a wavelength $\lambda_A$ and, in depth, a trace OB not identical to the trace OA and different in its wavelength $\lambda_B$ and/or in its amplitude $\alpha_B$.

8. A tread according to claim 1, characterized by the fact that the incision (1) has, on the surface of the tread, a trace OA which is undulated circularly, sinusoidally or zig-zag, the amplitude $\alpha_A$ and the wavelength $\lambda_A$ of which are constant over the entire length of the trace, and, in depth, a trace OB which is undulated or zig-zag but the amplitude $\alpha_B$ of which decreases as a function of the depth and thus with constant wavelength $\lambda_B$.

9. A tread according to claim 1, characterized by the fact that each of the protrusions (2) and cavities (3) of quadrilateral base has four faces which are entirely convex curved.

10. A tread according to claim 1, characterized by the fact that the protrusions (2) have four entirely convex curved faces and the cavities (3) have four entirely concave curved faces.

* * * * *